United States Patent [19]

Kugler

[11] Patent Number: 4,944,864

[45] Date of Patent: Jul. 31, 1990

[54] PROCESS USING CRACKING CALALYST CONTAINING STRONTIUM CARBONATE

[75] Inventor: Edwin L. Kugler, Glen Gardner, N.J.

[73] Assignee: Exxon Research and Engineering Company, Florham Park, N.J.

[21] Appl. No.: 328,845

[22] Filed: Mar. 27, 1989

Related U.S. Application Data

[60] Division of Ser. No. 14,469, Feb. 13, 1987, Pat. No. 4,824,815, which is a continuation-in-part of Ser. No. 743,593, Jun. 11, 1985, abandoned.

[51] Int. Cl.$^5$ .............................................. C10G 11/05
[52] U.S. Cl. ..................................... 208/120; 208/524; 208/121; 208/149
[58] Field of Search ........... 208/120, 121, 149, 52 CT

[56] References Cited

U.S. PATENT DOCUMENTS

| | | | |
|---|---|---|---|
| 3,030,300 | 4/1962 | Flanders et al. | 208/114 |
| 4,179,409 | 12/1979 | Gladrow et al. | 502/525 |
| 4,238,362 | 12/1980 | Bertus et al. | 208/52 CT |
| 4,279,735 | 7/1981 | Bertus et al. | 208/120 |
| 4,396,496 | 8/1983 | Schwarf et al. | 208/113 |
| 4,432,890 | 2/1984 | Beck et al. | 502/62 |
| 4,446,011 | 5/1984 | Wheelock et al. | 208/121 |
| 4,452,693 | 6/1984 | Schucker et al. | 208/121 |
| 4,515,683 | 5/1985 | Beck et al. | 208/113 |
| 4,520,120 | 5/1985 | Mitchell et al. | 502/525 |
| 4,743,358 | 5/1988 | Kugler | 208/121 |
| 4,750,987 | 6/1988 | Beck et al. | 208/120 |
| 4,750,988 | 6/1988 | Mitchell et al. | 208/120 |
| 4,824,815 | 4/1989 | Kugler | 208/52 CT |

*Primary Examiner*—Anthony McFarlane
*Attorney, Agent, or Firm*—John W. Ditsler

[57] ABSTRACT

This invention relates to a catalyst suitable for use in a fluid catalytic process and a method of using the catalyst on hydrocarbons containing one or more poison metal of vanadium or nickel to convert the hydrocarbons to lower boiling fractions. The catalyst contains a particulate and substantially water-insoluble strontium compound (in addition to a conventional zeolite and catalyst matrix) which reacts with and traps the metal poison to preserve the structure of the zeolite and, in addition, lowers the coke make and hydrogen production.

8 Claims, 2 Drawing Sheets

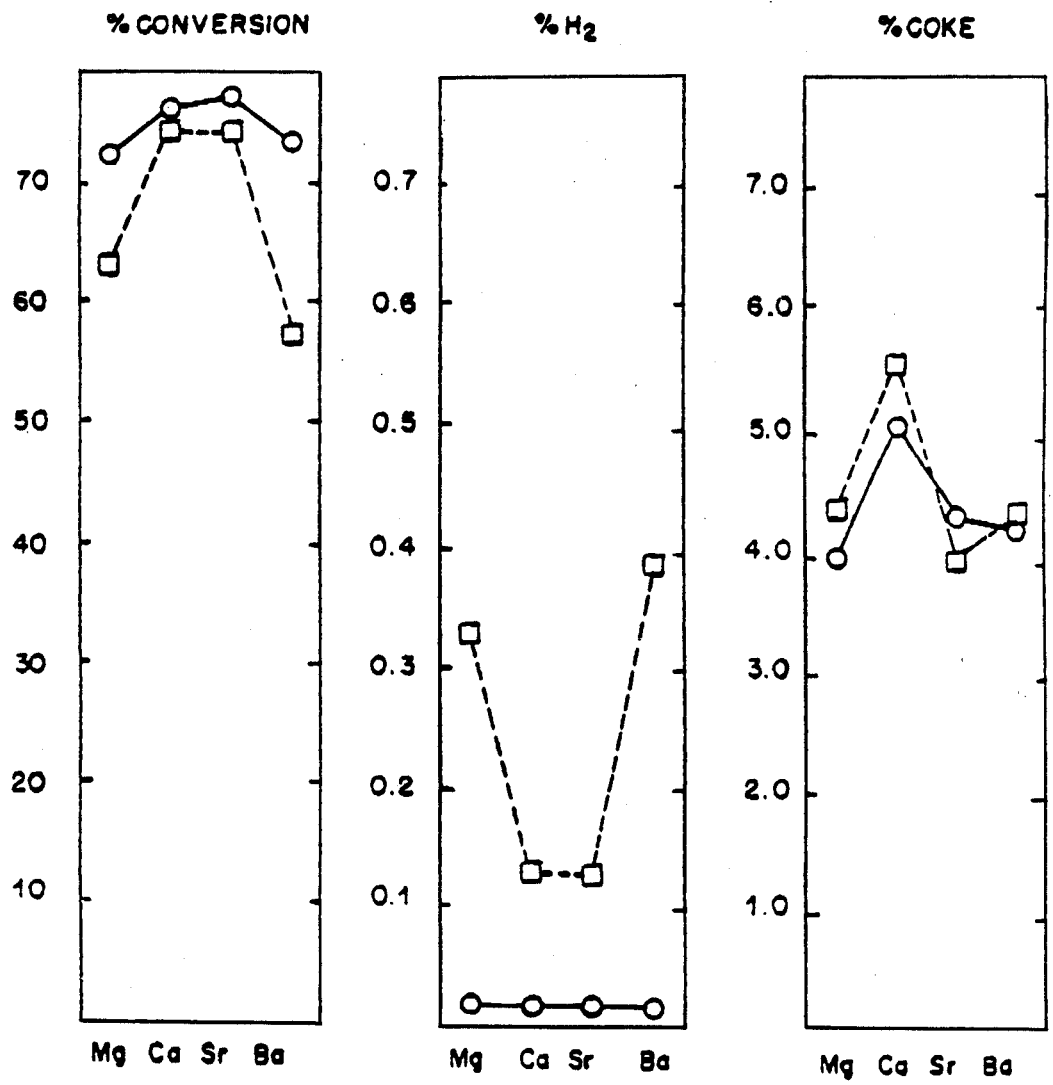
FIG. 2 (a,b,c)

PROCESS USING CRACKING CATALYST CONTAINING STRONTIUM CARBONATE

This is a division of application Ser. No. 014,469, filed 2/13/87, now U.S. Pat. No. 4,824,815, which is a continuation-in-part of application Ser. No. 743,593, now abandoned.

BACKGROUND OF THE INVENTION

1. Field of the Invention

This invention relates to a catalyst suitable for use in a fluid catalytic process and a method of using the catalyst on hydrocarbons containing one or more soluble metal poisons (vanadium, nickel or iron) to convert the hydrocarbons to lower boiling fractions. The catalyst contains one or more particulate, discrete, substantially water-insoluble strontium compounds (in addition to a conventional zeolite and catalyst matrix) which react with and trap the metal poison to preserve the structure of the zeolite and, in addition, lower the coke and hydrogen production.

2. Discussion of Related Art

One major operation in the modern refinery is the process of catalytic cracking. In this process, some of the heavier oils (often called "gas oils") produced upon fractionation of whole crude oil are decomposed or "cracked" using fluidized zeolite-containing catalysts. This process was developed during World War II to provide high octane gasoline for use in turbocharged fighter aircraft.

As the supply of light, sweet crude oils has dwindled during past years, catalytic cracking has become increasingly important in maintaining a supply of hydrocarbons suitable for use in various fuels such as gasoline. A problem that has occurred because of the increasing use of heavier, more sour crudes is that the heavier crudes contain substantially more organic metal compounds, such as vanadium and nickel porphyrins. These metals cause many undesirable reactions in heavy oil cracking catalysts in that the metals, specifically nickel and vanadium, are quite harmful to the fluidized cracking catalysts used. These metals, present in the high-boiling fractions, deposit on cracking catalyst and accumulate with time. They act as poisons and have the resulting effect of increasing undesirable hydrogen and coke yields and as well as decreasing the selectivity of the catalyst in making liquid products. Recently, vanadium has been found not only to increase hydrogen and coke yields but also to attack the zeolite itself, the high activity component of a catalytic cracking catalyst. See, Ritter et al, "A Look at New FCC Catalysts for Resid", Oil and Gas J., July 6, 1981, pg. 103. The mode of vanadium attack is not understood; however, available data indicate that vanadium can migrate through the catalyst particle and accumulate in areas of high zeolite concentration.

All zeolites appear to be susceptible to vanadium attack although the level of susceptibility appears to vary with the type of zeolite and its extent and type of cation exchange.

The past practice had been either to avoid charging feedstocks boiling above about 1050° F. and/or limiting total metal concentrations in the feedstocks to below about 1 ppm. As noted above, these practices are no longer viable and charging heavier feedstocks containing metals is becoming increasingly necessary.

To counteract the effect of these metals, various workers have included additives such as antimony, tin, barium, calcium, manganese and bismuth into cracking catalysts to provide some measure of protection against deactivation. These so-called passivation procedures may be seen in, e.g., U.S. Pat. Nos. 3,711,422 (antimony); 3,977,963 (bismuth or manganese); 4,101,417 (tin); 4,238,362 (antimony); 4,279,735 (antimony); 4,377,494 (barium); 4,451,355 (calcium) and 4,473,463 (barium).

Other strontium compounds have been included in cracking catalysts. For instance, strontium has been ion exchanged into the zeolite, e.g., U.S. Pat. No. 3,835,030. Soluble strontium compounds, especially SrO, have been included in fluid cracking catalysts for a variety of reasons, e.g., U.S. Pat. Nos. 4,415,480; 4,382,878; 4,093,536; Ger. Offen. DE No. 2,431,983. Strontium silicate has been added as a catalyst activator. Zul'fugarov et al, "Catalyst for cracking petroleum fractions", Inst. Inorg. and Phys. Chem., Acad. of Sci., Azerbaidzhan S.S.R., (1980).

Catalytic cracking catalysts have been treated with water-soluble, non-particulate compounds to alleviate problems associated with vanadium containing feedstocks. See, WP No. 8203225 or U.S. Pat. No. 4,432,890.

None of the cited prior art references suggests a catalyst containing particulate, substantially water-insoluble strontium materials as an effective method for mitigating the deleterious effects of nickel and vanadium contained in catalytic cracking feedstocks.

SUMMARY OF THE INVENTION

The invention deals with a catalyst suitable for catalytically cracking a hydrocarbon containing one or more of vanadium or nickel-bearing compounds into lower boiling components without substantial degeneration of the catalyst. The catalyst comprises a zeolitic composition, a clay or refractory inorganic binder matrix and an amount of a particulate substantially water-insoluble strontium-containing material in an amount effective to prevent substantial degeneration of the included zeolite due to poisoning by the metal poisons. The strontium-containing material is one or more compounds which form vanadates or other similar high melting compounds in the FCCU regenerator. The most preferred material is strontium carbonate.

Also, the invention relates to a process for the cracking of hydrocarbons containing one or more vanadium or nickel-containing compounds to lower boiling hydrocarbons by use of the inventive catalyst.

BRIEF DESCRIPTION OF THE DRAWINGS

FIG. 2 provides a comparison between the effectiveness of FCCU catalysts containing the inventive strontium additive and catalysts containing other alkaline earth metals.

DESCRIPTION OF THE PREFERRED EMBODIMENT

Figure 1:
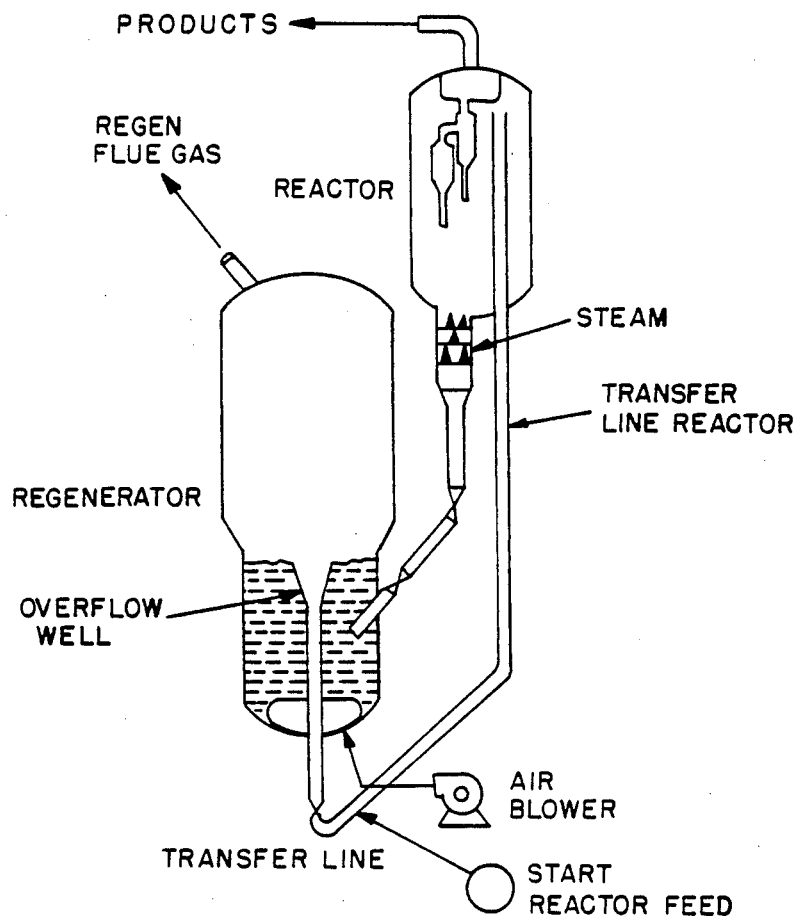
FIG. 1 depicts, in schematic fashion, the major portions of a typical fluidized catalytic cracking unit.

The catalyst composition of this invention is made up of a zeolitic material, a matrix material, and a particulate, substantially water-insoluble strontium-containing material in an amount sufficient to prevent substantial degradation of the zeolite by poisoning with at least one of vanadium or nickel bearing compounds.

The zeolitic material used in catalytic cracking catalysts is generally an aluminosilicate zeolite. Zeolites are characterized as crystalline, three dimensional structures of silicon and aluminum which are linked together through shared oxygen atoms. The structure formed is microporous and usually contains uniform cavities connected by similarly uniform channels. The generalized formula may be represented as follows:

$$xM_{2/n}O:Al_2O_3:1.5-100SiO_2 \cdot yH_2O$$

where M is a metal cation, n is the valence of that metal, x is between 0 and 1, and y is the number of waters. M may be an alkali metal, alkaline earth metal, or a lanthanide series material. Good cracking activity usually requires reduction of the alkali metal content to as low as possible; often less than 0.5 wt. %. In a typical catalyst, M will be one or more of ammonium, lanthanum, cerium, neodymium, or praesodymium.

The zeolite material used in this invention will be one having an effective pore size of greater than about 5Å diameter usually, however, less than 15Å. Naturally occurring zeolites which may be suitable include gmelinite, faujasite, cancrinite, offretite, mordenite or similar materials. Suitable synthetic zeolites include X, Y, L, beta, many of the ZSM series and omega. Obviously, zeolitic materials may be aluminosilicates, per se, or those structures with boron, phosphorus, gallium, or germanium introduced into the framework. The preferred materials are faujasite, Type Y and "ultrastable" or high silica Type Y. The zeolitic material may be present in the final catalyst in an amount from 3-35 percent by weight, but preferably 3 to 25 percent by weight.

The zeolitic material (usually after ion exchange to remove any alkali metal and to incorporate an appropriate cation, e.g., lanthanide ions) is incorporated in a catalyst matrix material. The matrix may include one or more of natural mineral clays such as kaolin, halloysite, or montmorillonite and one or more inorganic oxides such as amorphous inorganic oxides, e.g., silica, alumina, silica-alumina, silica-zirconia, silica-magnesia, alumina-boria, alumina-titania, and the like, and mixtures thereof. Silica or alumina may be used as binders to combine the various components of the catalyst.

The strontium compound is introduced into the catalyst as a discrete component found generally dispersed in the matrix and apart from the zeolitic material. Although any particulate and generally water-insoluble strontium material which will form a high melting, i.e., greater than about 670° C., products with vanadium or nickel or mixtures thereof in a FCCU regenerator; the preferred material is a carbonate. Operable materials include strontium silicate, strontium aluminate, strontium titanate, strontium zirconate and strontium carbonate. For use with vanadium containing feeds, strontium carbonate is most preferred. Although the relative amount of strontium-containing material should be substantially in excess of that needed to retain all of the poison metals included in a particular feed, any amount will provide some benefit.

A cracking catalyst particle made according to the invention would contain zeolite, matrix and the strontium-containing additive. The zeolitic material provides activity to crack gas oils to gasoline; the matrix often provides activity to crack molecules too large for the zeolite and provides the mass and physical properties for proper fluidization and attrition resistance within the cat-cracking unit. The strontium compound actively competes with the zeolite for vanadium so that metal poisons contacting the catalyst preferentially reacts with the strontium to prevent degradation of the zeolite.

The current understanding of metals attack on cracking catalyst indicates that metal porphyrin molecules are deposited on the exterior surface of catalyst particles during cracking. Cracking takes place in the "transfer line" shown in FIG. 1. The porphyrin molecules diffuse poorly and are too large to penetrate the zeolite. Consequently, they probably remain adsorbed onto the first surface of contact. This should produce an eggshell type deposit. After cracking, the product gasoline is steam-stripped from the catalyst and the hydrocarbon residues remaining on the catalyst are burned from the catalyst in the regenerator. Metals present on the catalyst are oxidized in the regenerator.

Although metal porphyrin molecules are probably deposited on the external catalyst surface during cracking, the metallic poisons become mobile at the elevated temperatures present in the regenerator. For instance, vanadium pentoxide melts at 670° C., below most FCCU regenerator temperatures, and therefore may migrate during the catalyst burn. The vanadium may diffuse from its initial exterior position and react with the zeolite or other catalyst components. In a catalyst containing zeolite, clay and binder, the zeolite is usually the most reactive component toward the metal poison.

Damage to the zeolite would therefore be substantially lessened by including a strontium containing component which is more reactive to vanadium than the zeolite. The strontium-compound forms high melting (and therefore immobile) compounds and prevents the metal poison compounds from migrating to the zeolite.

The catalyst of the present invention can be prepared by any one of several conventional methods. One method comprises making an inorganic oxide hydrogel and separate aqueous slurries of the zeolite component, the particulate strontium-containing material and, if desired, the catalytically inert component. The slurries can then be blended into the hydrogel, and the mixture homogenized. The resulting homogeneous mixture can be spray-dried and washed free of extraneous soluble salts using, for example, a dilute ammonium carbonate solution and water.

Alternatively, the matrix may be a sol, aluminum chlorohydrate, or other known matrix material. The strontium containing particulate material may also be physically mixed with known catalytic cracking catalyst compositions.

The catalyst composition of this invention is employed in the cracking of nickel- or vanadium-containing charge stocks to produce gasoline and light distillate fractions from heavier hydrocarbon feedstocks. The charge stocks generally are those having an average boiling temperature above 600° F. (316° C.) and include materials such as gas oils, certain lighter resids, and the like.

The charge stocks employed in the process of this invention can contain significantly higher concentrations of vanadium or nickel than those employed in the conventional catalytic cracking processes, in that the catalyst of this invention is effective in cracking processes operated at vanadium contaminant levels in excess of 4,000 ppm (on the catalyst), even exceeding 30,000 ppm. Thus, the charge stocks to the catalytic cracking process of this invention can contain vanadium contaminants up to 3.5 ppm and higher with no significant reduction in effective catalyst life when compared with conventional catalytic cracking processes.

Although not to be limited thereto, a preferred method of employing the catalyst of this invention is by fluid catalytic cracking using riser outlet temperatures between about 900° and about 1100° F. (482° to 593° C.). Under fluid catalytic cracking conditions, the cracking occurs in the presence of a fluidized composited catalyst in an elongated reactor tube commonly referred to as a riser. See FIG. 1. Generally, the riser has a length-to-diameter ratio of about 20, and the charge stock is passed through a preheater, which heats the charge stock to a temperature of at least 400°F. (204° C.). The heated charge stock is introduced into the bottom of the riser.

In operation, a contact time (based on feed) of up to 15 seconds and catalyst-to-oil weight ratios of between about 4:1 and about 15:1 are employed. Steam can be introduced into the oil inlet line to the riser and/or introduced independently to the bottom of the riser to assist in carrying regenerated catalyst upward through the riser.

The riser system may be operated at a pressure in the range of about 5 to about 50 psig is normally operated with catalyst and hydrocarbon feed flowing concurrently into and upward into the riser at about the same velocity, thereby avoiding any significant slippage of catalyst relative to hydrocarbon in the riser and avoiding formation of the catalyst bed in the reaction flow-stream.

The catalyst containing the metal contaminants and the carbon is separated from the hydrocarbon product stream as it is withdrawn from the reactor. The catalyst is passed to the regenerator. In the regenerator, the catalyst is heated to a temperature in the range of about 800° to about 1800° F. (427° to 982° C.), preferably 1150° to 1400° F. (621° to 760° C.) for a period of time ranging from three to thirty minutes in the presence of an oxygen-containing gas. This burning step is conducted to reduce the concentration of the carbon on the catalyst to less than 0.3 weight percent by conversion of the carbon to carbon monoxide and carbon dioxide.

The following examples are presented to illustrate objectives and advantages of the invention. However, they are not intended to limit the invention in any manner.

EXAMPLE 1

The formation of various metal vanadates from vanadium pentoxide and other metal oxides and carbonates was accomplished by preparing stoichiometric mixtures and heating for two hours in air at 700° C. The products were cooled and examined for compound formation by x-ray powder diffraction. The reactions are listed below:

$$MO + V_2O_5 \longrightarrow MV_2O_6$$
$$2MO + V_2O_5 \longrightarrow M_2V_2O_7$$
$$3MO + V_2O_5 \longrightarrow M_3V_2O_8$$
$$MCO_3 + V_2O_5 \longrightarrow MV_2O_6 + CO_2$$
$$2MCO_3 + V_2O_5 \longrightarrow M_2V_2O_7 + 2CO_2$$
$$3MCO_3 + V_2O_5 \longrightarrow M_3V_2O_8 + 3CO_2$$
$$M = Mg, Ca, Sr, Ba, Zn, Cd$$

All of the monometal and dimetal vanadates were formed from stoichiometric mixtures at temperatures typical of an FCCU regenerator. The trimetal vanadates did not form as easily. Tri-magnesium vanadate did not form at all, while tri-barium vanadate formed cleanly. The other Group II metals provided mixtures of $M_2V_2O_7$ and $M_3V_2O_8$.

The relative reactivities of the Group II metals were evaluated with a competitive reaction experiment to determine whether the trapping compound or the zeolite had greater reactivity with vanadium. The zeolite, trapping agent and vanadium pentoxide were mixed together prior to being heated for two hours in air at 700° C. The zeolite comprised 50% of the mixture; the remaining 50% was trapping agent and vanadium pentoxide. The Group II metal-to-vanadium atomic ratio was maintained at 2.0. The starting material and final product were compared using x-ray powder diffraction. The line intensities were used to determine the percentage crystallinity that remained after thermal treatment.

The results are summarized in Table 1. Of the alkaline earth elements, no crystallinity was retained with magnesium oxide or barium carbonate trapping agents. Strontium carbonate showed the most favorable results with 50% crystallinity retention. Calcium oxide showed some crystallinity retention but not as much as the strontium. Of the Group IIb elements, zinc oxide showed the best results with 40% crystallinity retention whereas cadmium oxide showed limited effectiveness with 5% zeolite intensity remaining after thermal treatment.

TABLE 1

| Vanadium Trapping Effectiveness of Group II Metals | |
|---|---|
| Trapping Agent | % Zeolite Crystallinity |
| MgO | 0 |
| CaO | 20 |
| SrCO3 | 50 |
| BaCO3 | 0 |
| ZnO | 40 |
| CdO | 5 |

EXAMPLE 2

Preparation of Ammonium Exchanged 3A Matrix

Amorphous silica-alumina gel was obtained from Davison Chemical Company as MS-25 wet cake. This gel is a high solids suspension that would normally be fed to a spray dryer. The alumina content in the silica-alumina was a nominal 25%. The suspension was filtered to produce wet 3A gel. This material was subsequently ion exchanged with ammonium sulfate and washed with distilled water to reduce the sodium content below 0.1% in the dried gel.

The procedure for exchanging the gel was to slurry 2500 gm. of raw gel with 2 l. of 5% $(NH_4)_2SO_4$ solution in a large blender. The slurry was poured into a vacuum filter to pull the liquid through the filter paper. An additional 8 l. of ammonium sulfate solution was added to the slurry to increase the wash volume. The slurry was filtered until a gel cake formed on the filter paper and cracked. Filtering typically required all day or overnight. The ammonium sulfate exchange was repeated a second time using the product gel cake from the first exchange and a total of 10 l. of salt solution. After the ammonium ion exchange steps, the product was washed twice with distilled water. Again the gel cake was first slurried in a blender using 2 l. of water this time. A total volume of 10 l. of distilled water was used in each wash step.

The exchanged and washed 3A gel was stored in a plastic bag within a closed bucket until needed. Typical weight loss on drying 3A gel is 88%.

Preparation of Zeolite Promoters

The ultrastable Y-zeolite used in the catalyst preparation was Union Carbide LZ-Y82. It was used as received. The lanthanum exchanged Y-zeolite was prepared from Union Carbide LZ-Y52, a synthesized sodium Y-zeolite. The proportions used for exchange were 40 gm. of $LaCl_3$, 60 gm. of LZ-Y52 zeolite and 600 gm. of water. A slurry was prepared at 60° C. and maintained for 1 hour. The product was filtered and washed with 2 l. of distilled water. A second exchange followed the same procedure using the filtered product of the first exchange. After two exchanges the zeolite was dried at 110° C. in a forced air oven and subsequently calcined for 1 hr. at 400° C. After calcining, a final lanthanum chloride exchange was made using 40 gm. of $LaCl_3$ in 600 gm. of water at 60° C. After filtering and washing, the product was dried at 110° C. and stored for subsequent use.

Preparation of Catalyst in 3A Matrix

The catalyst was prepared by stirring the dry components into 3A gel. Preparations of gel, zeolite and catalyst additives were weighed out to give the desired proportions on a dry basis. Weight loss data were determined by heating gel or zeolite to 875° C. in inert gas, typically argon or nitrogen. Weight loss measurements were not made on vanadium trapping agents since some would decompose at high temperatures. These additives were assumed to be water free. The dry components were stirred into the damp 3A gel with a tablespoon. If the gel became particularly stiff, small quantities of distilled water were added to facilitate stirring. After the components were mixed together, the wet gel was dried overnight at 110° C. in a forced air oven and subsequently ground with an agate mortar and pestle to obtain a fine powder.

Impregnation with Vanadium Compounds

Samples with vanadium were prepared by incipient wetness impregnation using vanadyl acetylacetonate in methanol. The vanadyl acetylacetonate has limited solubility: 0.5 gm. would dissolve in about 100 g of methanol. This required multiple impregnations with air drying between steps. After impregnation and drying was completed, the sample was calcined in air for 2 hr. at 425° C. to decompose the acetylacetonate; finally the sample was steamed for 16 hr. at 730° C. to simulate hydrothermal conditions in an FCCU.

EXAMPLE 3

Ultrastable Y Catalyst

The ultrastable Y catalysts produced in Example 2 (with and without vanadium inclusion) were then tested. The ASTM microactivity test (MAT or ASTM D-3907-80) was used to evaluate catalyst activity and selectivity. The feed was an ASTM standard vacuum gas oil as described below:

| AMOCO OIL NO. FCC 893 FEED CHARACTERIZATION OF D-32 ASTM STANDARD MAT FEED | | |
|---|---|---|
| | Distillation Data | |
| Vol | ASTM D-1160 Temp, °F. | 760 mm TBP Temp, °F. |
| IBP | 179 | 388 |
| 5 | 287 | 504 |
| 10 | 330 | 574 |
| 20 | 374 | 632 |
| 30 | 412 | 682 |
| 40 | 444 | 726 |
| 50 | 479 | 773 |
| 60 | 518 | 821 |
| 70 | 558 | 870 |
| 80 | 603 | 925 |
| 90 | 657 | 991 |
| 95 | 694 | 1025 |
| FBP | 714 | 1061 |
| Pour Point, °F. | | 80 |
| Gravity, °API | | 27.6 |
| Vol ABP, °F. | | 778 |
| Total Nitrogen, ppm | | 875 |
| Basic Nitrogen, ppm | | 281 |
| Sulfur, Wt % | | 0.64 |
| Conradson Carbon, Wt % | | 0.18 |
| Ramsbottom Carbon, Wt % | | 0.21 |
| Refractive Index | | 1.4772 at 67° C. |
| Aniline Point, °F. | | 182 |
| Viscosity, CS+ | | 4.42 at 210° F. |
| UOPK | | 12.02 |

Prior to MAT evaluation, the catalysts were steamed 16 hours at 730° C. to simulate the hydrothermal aging that occurs in a commercial FCCU.

The effect of adding strontium carbonate to ultrastable Y-zeolite in silica-alumina (3A) matrix is presented in Table 2. A catalyst with 15% zeolite provided a MAT conversion of 69.8% with hydrogen and coke yields of 0.06 and 2.73%, respectively. Replacing 10% of the 3A matrix with strontium carbonate had no effect on MAT activity or hydrogen yield but produced a slight decrease in coke make. Hence, replacing a small amount of matrix material with strontium carbonate had a negligible effect on catalyst performance. These same catalysts loaded with 5000 ppm vanadium (experimental procedure in Example 2) showed the benefits of strontium carbonate for deactivating vanadium. The base catalyst with vanadium produced 0.72% hydrogen and 5.78% coke. Vanadium increased hydrogen make by a factor of 12 and coke by a factor of 2. However, the vanadium doped USY catalyst with strontium carbonate made considerably less hydrogen and less coke than the unprotected base. The strontium trap substantially reduced hydrogen production and reduced coke by a factor of about 2.

TABLE 2

| Strontium Carbonate Mitigates Hydrogen and Coke Formation | | | | |
|---|---|---|---|---|
| | % V | % Conv. | % $H_2$ | % COKE |
| 15% U.S. H-Y IN 3A MATRIX | 0 | 69.8 | 0.06 | 2.73 |
| 10% $SrCO_3$ ADDED | 0 | 70.7 | 0.05 | 2.45 |
| 15% U.S. H-Y IN 3A MATRIX | 0.5 | 61.9 | 0.72 | 5.78 |
| 10% $SrCO_3$ ADDED | 0.5 | 59.8 | 0.38 | 3.39 |

Rare-earth-exchanged Y Catalyst

Rare earth exchanged Y-zeolites are much more active than ammonium exchanged US Y. The more active zeolite reduces the contribution of the 3A matrix on the cracking activity and accentuates the role of the zeolite. Data on lanthanum Y-zeolite in 3A matrix are provided in Table 3. The catalyst with lanthanum Y-zeolite produced a MAT conversion of 83%. Adding 10% strontium carbonate in place of an equivalent amount of matrix lowered the MAT conversion to 77%. The catalyst with strontium carbonate had a lower coke yield than the base; since conversion and coke yield typically increase and decrease together when no metals are present, this behavior is expected.

Vanadium addition to both samples distinguished the material containing the trapping agent. The catalyst with strontium carbonate had higher activity, lower hydrogen yield and less coke than base-case La-Y catalyst. The base case catalyst lost 16% conversion when 5000 ppm vanadium was added. The catalyst with strontium carbonate started at a lower value but lost only 3% conversion. The catalyst with the vanadium trap also made less coke, but most importantly, this was less coke at higher conversion. Hence, strontium carbonate particles blended into the catalyst matrix had a favorable effect on both activity and selectivity in a high vanadium environment.

TABLE 3
Strontium Carbonate Also Effective with Rare Earth Y-Zeolites

|  | % V | % Conv. | % H$_2$ | % COKE |
|---|---|---|---|---|
| 17.6% La-Y IN 3A MATRIX | 0 | 83.0 | 0.03 | 5.25 |
| 10% SrCO$_3$ ADDED | 0 | 77.0 | 0.02 | 4.35 |
| 17.6% La-Y IN 3A MATRIX | 0.5 | 67.0 | 0.55 | 6.29 |
| 10% SrCO$_3$ ADDED | 0.5 | 74.0 | 0.13 | 4.00 |

EXAMPLE 4

Preparation of Strontium Ion Exchanged Cracking Catalyst (Comparative Data)

A sample of RC-30, a commercial cracking catalyst containing rare earth Y-zeolite manufactured by Davison Chemical Company, was ion exchanged with strontium to determine the effects of strontium ion on zeolite activity and vanadium resistance.

A 50 g sample of RC-30 was mixed with 25 g of Sr(NO$_3$)$_2$ and slurried in 500 g of distilled water. The slurry was heated to 56° C., maintained at that temperature for 1 hr., filtered and rinsed with distilled water. The filtered catalyst sample was dried at 110° C. in a forced air oven and then calcined for 3 hr. in a muffle furnace at 425° C. A reference sample was prepared by adding 50 g of RC-30 cracking catalyst to 500 g of distilled water, heating the slurry to 56° C., maintaining the temperature for 1 hr. then filtering, rinsing, drying in a forced air oven at 110° C., and finally calcining the sample for 3 hr. in a muffle furnace at 425° C. Chemical analysis of the strontium ion exchanged RC-30 sample confirmed 2.49 wt. % Sr in the catalyst. The water washed reference sample of RC-30 contained 0.01 wt. % Sr.

Evaluation of Strontium Ion Exchanged Cracking Catalyst

The strontium ion exchanged RC-30 sample and the water washed reference sample were steamed 16 hr. at 730° C. and then tested using the ASTM Microactivity Test described in Example 2. MAT test results are shown in Table 4 below:

TABLE 4

| Catalyst | % V | % Conv. | % H$_2$ | % Coke |
|---|---|---|---|---|
| RC-30 (water washed) | 0 | 86.7 | 0.05 | 7.59 |
| RC-30 (Sr exchanged) | 0 | 82.2 | 0.05 | 5.73 |
| RC-30 (water washed) | 0.5 | 72.2 | 0.20 | 4.26 |
| RC-30 (Sr exchanged) | 0.5 | 61.5 | 0.28 | 4.42 |

This data shows that without vanadium, the water washed reference sample had slightly higher activity than the strontium ion exchanged RC-30. However, when vanadium was added to the samples by impregnation, followed by calcining at 425° C. and steaming for 16 hr. at 730° C. as previously described in Example 2, the strontium ion exchanged sample performed poorly compared to the reference sample. The strontium ion exchanged sample lost about 20% conversion whereas the conversion for the reference sample was reduced about 15%. More important than the individual changes is a comparison of the overall performance. The RC-30 reference sample had about 72% conversion with 0.5% V whereas the strontium ion exchanged RC-30 had about 62% conversion with an identical vanadium loading. The similar hydrogen and coke levels with a 10% difference in conversion emphasize the negative effects of strontium ion exchange on catalyst performance. Thus, the vanadium resistance of the zeolite is reduced when strontium ion is exchanged into the zeolite structure.

EXAMPLE 5

Catalysts Prepared by Strontium Impregnation (Comparative Data)

A 180 g sample of RC-30 was impregnated with a solution of 28.60 g of Sr(NO$_3$)$_2$ dissolved in 126 g of distilled water. The sample was dried in a forced air oven at 110° C. and calcined 3 hr. at 535° C. in a muffle furnace. The strontium nitrate loading was calculated as being equivalent to 10 wt. % SrCO$_3$ on RC-30. The strontium impregnated catalyst and a reference sample of calcined RC-30 were steamed 16 hr. at 730° C. and then evaluated using the ASTM Microactivity Test described in Example 2. MAT data are presented in Table 5 below.

TABLE 5

| Catalyst | % V | % Conv. | % H$_2$ | % Coke |
|---|---|---|---|---|
| RC-30 | 0 | 83.8 | 0.05 | 6.41 |
| RC-30 + 10% SrCO$_3$ | 0 | 75.6 | 0.03 | 4.68 |
| RC-30 | 0.5 | 71.8 | 0.22 | 4.41 |
| RC-30 + 10% SrCO$_3$ | 0.5 | 59.8 | 0.07 | 2.57 |

As shown in Table 5, the reference sample of RC-30 had about 84% conversion while the catalyst impregnated with strontium had about 76% conversion. Therefore, adding an amount of strontium nitrate equivalent to 10% strontium carbonate to the pre-formed catalyst had a negative effect on activity. Vanadium addition to these samples as described in Example 2, followed by calcining and steaming caused both samples to lose activity. The base case RC-30 had about 72% conversion, but lost about 12% conversion when 0.5% vanadium was added to the sample. The strontium impregnated RC-30 had about 60% conversion, losing about 16% conversion when 0.5% vanadium was added.

The data in Table 5 show that adding soluble strontium to a commercial cracking catalyst will have adverse effects on its vanadium resistance. Apparently, strontium ions in solution during the impregnation treatment will ion exchange into the zeolite structure to reduce its vanadium tolerance. Accordingly, strontium must remain physically separated from the zeolite structures or as insoluble forms to prevent ion exchange.

EXAMPLE 6

Strontium Carbonate on Separate Catalyst Particles

A cracking catalyst containing an effective amount of a vanadium trapping agent was produced by physically mixing a conventional commercial cracking catalyst with separate particles loaded with the trapping material.

An amount of alumina was mixed with strontium hydroxide in an amount sufficient to give (upon treatment with carbon dioxide) a resulting matrix having 10% by weight $SrCO_3$. The mixture was treated with $CO_2$ to convert the Sr(OH) to strontium carbonate.

The alumina/strontium carbonate mixture was then combined in a 1:2 ratio with RC-30. The effects of vanadium poisoning were assessed as in the above examples. As was the case in those examples, the strontium-containing catalyst provided improved hydrogen and coke production (when impregnated with vanadium) over the catalyst/alumina reference sample.

TABLE 6

1:2 Mixture of $SrCO_3$ on Alumina with Cracking Catalyst Reduces Effects of Vanadium Poisoning

| Trapping Agent | Catalyst | % V | % Conv. | % $H_2$ | % Coke |
|---|---|---|---|---|---|
| $Al_2O_3$ | RC-30 | 0.0 | 79.4 | 0.04 | 5.69 |
| 10% $SrCO_3$ on $Al_2O_3$ | RC-30 | 0.0 | 80.1 | 0.03 | 5.34 |
| $Al_2O_3$ | RC-30 | 0.5 | 69.3 | 0.56 | 7.35 |
| 10% $SrCO_3$ on $Al_2O_3$ | RC-30 | 0.5 | 76.0 | 0.40 | 6.86 |

EXAMPLE 7

Strontium Carbonate Most Effective Vanadium Trapping Agent (Comparative Data)

The initial survey (shown in Example 1) of the reactivity of alkaline earth elements as vanadium trapping agents indicated that calcium was also effective in protecting zeolite crystallinity but that magnesium and barium were not. Four alkaline earth carbonates were tested for vanadium trapping in cracking catalyst. As with the strontium experiment, 10% of the metal carbonates were blended into a 3A silica-alumina matrix along with 17.6% La-Y zeolite. Data on MAT activity, hydrogen make and coke yield are presented in FIG. 2. The circles connected by solid lines are data obtained using catalyst without metals. The data points marked by squares and connected with dashed lines are for catalyst doped with 5000 ppm vanadium.

A comparison of cracking catalysts containing alkaline earth carbonates shows slight activity advantages with calcium and strontium carbonate over magnesium and barium when those catalysts are compared in the absence of the metal poisons. There is no difference in "no-metals" hydrogen make, but some variation in "no-metals" coke make. Magnesium carbonate was the best from the coke producing standpoint, catalysts containing strontium and barium carbonates were close seconds and the catalyst containing calcium was the worst. The performance of these same catalysts was vastly different when vanadium is added. As the x-ray powder diffraction data had indicated, magnesium and barium perform poorly at accumulating vanadium. Catalysts containing mangesium or barium compounds had low activities; the hydrogen production is high and coke production (although similar to "no-metals" values) is high for the activity.

By comparison, catalysts containing calcium and strontium carbonates perform well. The MAT activities and hydrogen yields are equivalent. However, the two additives are distinguished by coke production. The catalyst containing calcium carbonate has a much higher coke yield than the catalyst with strontium. This shows the principal advantage of strontium. The low coke at high poison metals content is an attractive feature for a catalyst used in units that are often coke-burn or regenerator throughput limited.

EXAMPLE 8

Zinc Oxide Has Poor Cracking Catalyst Performance (Comparative Data)

The initial survey of Group II metals as vanadium traps showed potential for zinc. Although zinc oxide reacted rapidly with vanadium pentoxide, it did not perform well in a cracking catalyst. Table 7 shows MAT evaluation data for zinc oxide in 3A matrix alone. Adding zinc oxide to the matrix lowered its activity and increased hydrogen make. The same type of difficulty was observed when US Y zeolite was included in the catalyst. The zinc oxide additive significantly increased the hydrogen and coke yield at constant activity without vanadium being present. Since zinc produced the same deleterious symptoms as does vanadium, it is not a reasonable vanadium trapping agent.

TABLE 7

Zinc Oxide Alone Increases Hydrogen and Coke

| | % Conv. | % $H_2$ | % COKE |
|---|---|---|---|
| 3A MATRIX | 56.2 | 0.04 | 2.06 |
| 10% ZnO IN 3A MATRIX | 44.0 | 0.21 | 1.90 |
| 15% U.S. H-Y IN 3A MATRIX | 69.8 | 0.06 | 2.73 |
| 10% ZnO ADDED | 69.7 | 0.37 | 3.82 |

What is claimed is:

1. A process for converting a hydrocarbon oil containing at least one vanadium-containing compound, nickel-containing compound, or mixture thereof to lower boiling hydrocarbon products which comprises contacting the oil at conversion conditions with a cracking catalyst containing
   (a) a zeolitic material;
   (b) a matrix material; and
   (c) strontium carbonate dispersed in the matrix as discrete particles, wherein strontium carbonate is present in an amount sufficient to form a product having a melting point greater than about 670° C. when the carbonate is reacted with the vanadium-containing compound, nickel-containing compound, or mixture thereof, at fluid catalytic cracking regenerator temperatures.

2. The process of claim 1 wherein the zeolitic material is an aluminosilicate.

3. The process of claim 2 wherein the zeolitic material is selected from faujasite and a synthetic zeolite having the structure of zeolite Y.

4. The process of claim 3 wherein the zeolitic material is at least partially exchanged with one or more of lanthanum, cerium, neodymium, and praesodymium.

5. The process of claim 3 wherein the matrix material is one or more natural mineral clays selected from kaolin, halloysite, and montmorillonite, and one or more inorganic oxides selected from silica, alumina, silica-alumina, silica-zirconia, silica-magnesia, alumina-boria, and alumina-titania.

6. The process of claim 5 wherein the matrix is silica-alumina cogel.

7. The process of claim 2 wherein the amount of zeolitic material ranges from 3 to 35 wt. %.

8. The process of claim 2 wherein the zeolitic material is a synthetic zeolite having the structure of zeolite Y.

* * * * *